(12) United States Patent
Hull (10) Patent No.: US 8,261,974 B2
(45) Date of Patent: Sep. 11, 2012

(54) INTEGRATED FINANCIAL TRANSACTION AND ACCESS SYSTEM

(75) Inventor: Robert Ernest Hull, Louisville, KY (US)

(73) Assignee: Robert E. Hull, Louisville, KY (US)

( * ) Notice: Subject to any disclaimer, the term of this patent is extended or adjusted under 35 U.S.C. 154(b) by 294 days.

(21) Appl. No.: 12/210,950

(22) Filed: Sep. 15, 2008

(65) Prior Publication Data

US 2009/0072020 A1 Mar. 19, 2009

Related U.S. Application Data

(60) Provisional application No. 60/972,482, filed on Sep. 14, 2007.

(51) Int. Cl.
*G06Q 40/00* (2012.01)

(52) U.S. Cl. .... 235/379; 235/380; 705/14.1; 705/14.17; 705/14.25; 705/14.27; 705/14.28; 705/14.29; 705/14.3; 705/14.32

(58) Field of Classification Search ................ 235/379, 235/380, 382, 492; 705/17, 18, 40, 42, 44
See application file for complete search history.

(56) References Cited

U.S. PATENT DOCUMENTS

| | | | |
|---|---|---|---|
| 4,700,055 A | 10/1987 | Kashkashian, Jr. | |
| 4,707,592 A | 11/1987 | Ware | |
| 5,770,843 A | 6/1998 | Rose et al. | |
| 6,041,314 A | 3/2000 | Davis | |
| 6,189,787 B1 * | 2/2001 | Dorf | 235/380 |
| 6,332,126 B1 * | 12/2001 | Peirce et al. | 705/14.25 |
| 6,378,775 B2 | 4/2002 | Hayashida | |
| 6,427,909 B1 | 8/2002 | Barnes et al. | |
| 6,466,918 B1 * | 10/2002 | Spiegel et al. | 705/27 |
| RE38,137 E | 6/2003 | Wynn | |
| 6,732,919 B2 | 5/2004 | Macklin et al. | |
| 7,401,731 B1 * | 7/2008 | Pletz et al. | 235/380 |
| 2002/0174016 A1 | 11/2002 | Cuervo | |
| 2003/0144935 A1 * | 7/2003 | Sobek | 705/35 |
| 2005/0096997 A1 * | 5/2005 | Jain et al. | 705/26 |
| 2008/0028473 A1 | 1/2008 | Cehelnik | |
| 2008/0164307 A1 | 7/2008 | Silverstein | |
| 2008/0177624 A9 | 7/2008 | Dohse | |

* cited by examiner

*Primary Examiner* — Thien M. Le
*Assistant Examiner* — Christopher Stanford
(74) *Attorney, Agent, or Firm* — Wood, Herron & Evans, LLP (57) ABSTRACT

A universal digital information management and transaction system facilitates a consumer's ability to organize, use and obtain personal data related to a consumer, including for example, the consumer's financial, health, and personal records. A consumer is provided with an online profile that stores all of the relevant consumer information, with a token associated with the consumer's profile to enable the consumer to securely login remotely to the system to access and manage all of their relevant information.

13 Claims, 7 Drawing Sheets

INTEGRATED FINANCIAL TRANSACTION AND ACCESS SYSTEM

CROSS-REFERENCE TO RELATED APPLICATIONS

This application claims priority on U.S. Provisional Patent Application Ser. No. 60/972,482, filed Sep. 14, 2007 by Robert E. Hull, the entire disclosure of which is incorporated by reference herein.

FIELD OF THE INVENTION

The invention is generally related to data processing, and in particular to digital information management of financial and other customer data.

BACKGROUND OF THE INVENTION

In today's society online banking has became a more convenient way to view statements, pay bills, send and transfer money. However, more than ever, consumers have multiple financial accounts with multiple financial institutions. In order to manage these different financial accounts, consumers are required to visit different web sites and then login each time to view different accounts. In addition, transferring funds between financial accounts from different financial institutions is often difficult, in many cases requiring the use of checks or electronic debit transactions to implement transfers, effectively replicating the process consumers often use to pay bills online.

In addition, consumers more than ever have several loyalty cards, gift cards, and coupons in order to receive points, discounts and other promotions at different online and brick and mortar merchants. Keeping track of all of these cards, coupons and promotions can be overwhelming for many customers, and in many instances, customers miss out promotional opportunities. For example, customers may not remember the amount of points, promotions, money the consumer may have accumulated, or may not remember to bring a card or remember their number when shopping with a merchant, and thus not receive loyalty credit for their purchases with a merchant.

Therefore, a need exists in the art for a manner of improving a consumer's management and access to their financial information.

SUMMARY OF THE INVENTION

The invention addresses these and other problems associated with the prior art by providing a universal digital information management and transaction system that facilitates a consumer's ability to organize, use and obtain personal data related to a consumer, including for example, the consumer's financial, health, and personal records. A consumer is provided with an online profile that stores all of the relevant consumer information, with a token associated with the consumer's profile to enable the consumer to securely login remotely to the system to access and manage all of their relevant information.

The system may include management functionality that enables a consumer to view all relevant financial, health and personal records, as well as access financial institutions associated with those records. The system may also allow a consumer to add, delete and update different accounts, as well as interact with all accounts such as to transfer funds between accounts, even when those accounts are with different financial institutions. The system may also enable a consumer to purchase goods from any and all merchants (e.g., retailers, hotels, restaurants, department stores, internet stores) that participate in the system. In addition, in some embodiments, the token may also be usable at merchant web sites and/or retail establishments to enable purchases to be made using the token. In some embodiments, for example, a consumer may be permitted to select from among multiple accounts to pay for a purchase after authenticating at the merchant using the token.

A universal digital information management and transaction system consistent with the invention may also provide access (with the permission of the consumer) to a consumer's profile by financial institutions and/or merchants, and enable a merchant, for example, to provide coupons or other promotional opportunities to a consumer via their profile. A system may also allow a consumer to store all of their loyalty information for multiple merchants with their profile, and via the system web site, view all member merchant loyalty accounts, coupons and promotions. A merchant may also be provided with access to the system to add points, coupons, money and promotions to their consumers' respective loyalty accounts.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize a universal digital information management and transaction system that a consumer may access using a login token such as a username with password & pin number, a card, a biometric identifier or other form of uniquely identifying and authenticating a consumer. The system provides an online web site that allows the consumer's information, typically associated with multiple financial institutions such as but not limited to banks, investments, and credit cards, to be viewed in detail and interacted with by the consumer.

Figure 1:
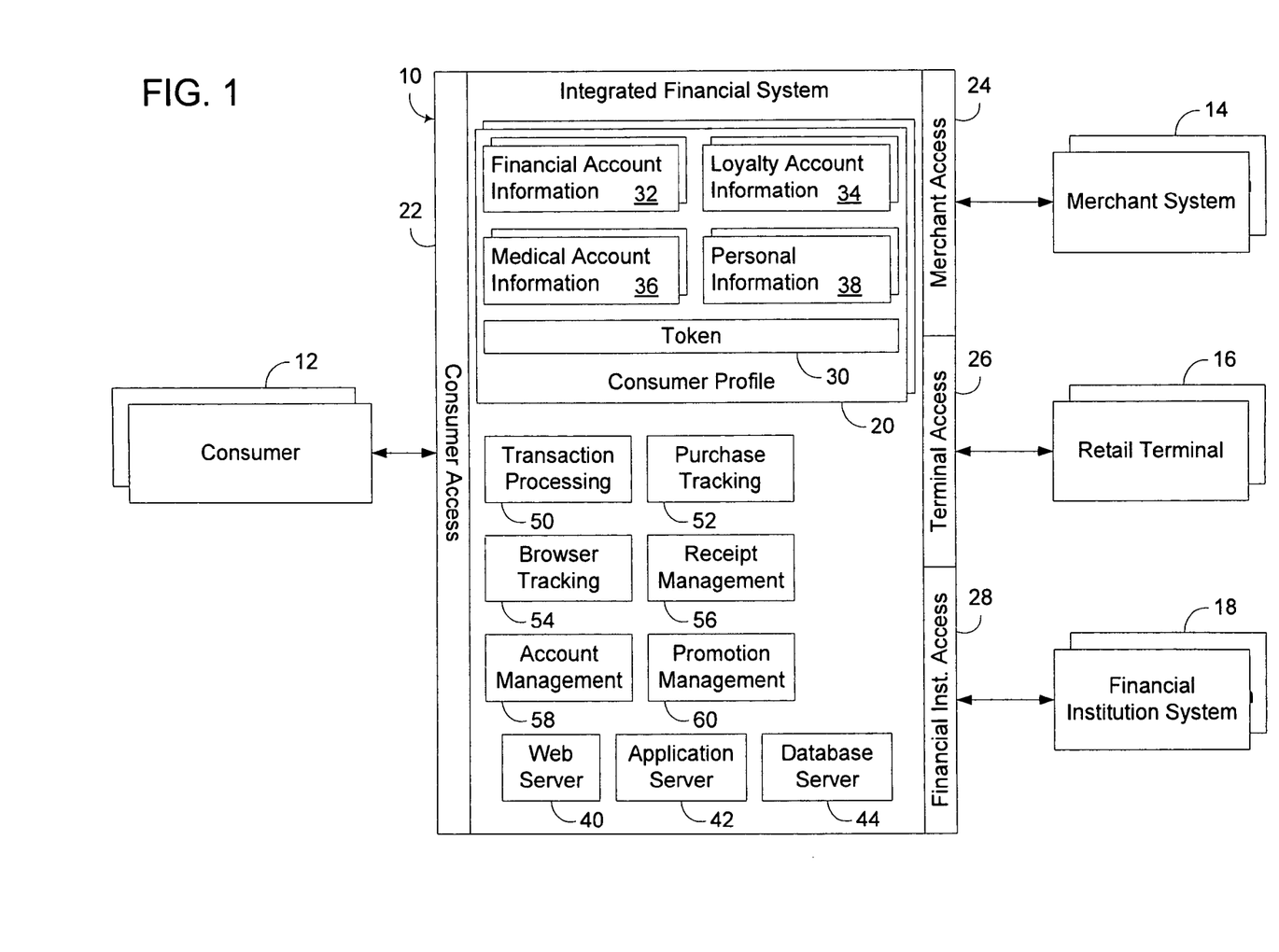
FIG. 1 is a block diagram of one implementation of an integrated financial transaction and access system consistent with the invention.

Turning to the Drawings, wherein like numbers denote like parts throughout the several views, FIG. 1 illustrates an integrated financial transaction and access system 10 consistent with the invention. System 10 provides access to a plurality of consumers 12, a plurality of merchants 14, a plurality of retail terminals 16 and a plurality of financial institutions 18, using access interfaces 22, 24, 26 and 28 respectively. Each consumer 12 is associated with a unique consumer profile 20. Access to consumer profile 20 by the associated consumer is managed by a token 30, which is used to authenticate the consumer and provide access to the profile. Token 30, for example, may be implemented using an account number, a username, a member number, etc., and may include additional authentication information such as a PIN, a password, answers to personal questions (e.g., mother's maiden name) or any type of biometric information. In addition, in some embodiments the token may include an identifier that is provided to the consumer on a card that is accepted by merchants in much the same manner as a credit or debit card. The identifier may be provided on a magnetic stripe or a bar code, or via other manners known in the art. Furthermore, in some embodiments, the token may be implemented as an account number that is associated with the integrated financial system, but that is also processable by conventional debit or credit card transaction systems. The operator of system 10, for example, may be an ISO for handling credit card transactions, such that swiping the card associated with a consumer profile in a conventional credit card processing terminal will route the transaction to the system in the same manner as a conventional credit card transaction. For merchants that do not participate in system 10, system can may process a transaction in the same manner as a conventional credit card transaction, such that the card is otherwise usable as a conventional financial card when used with merchants that do not participate in the system.

It is desirable for the integrated financial transaction and access system to be independent of at least a portion of the merchants and at least a portion of the financial institutions that access the system. Thus, the types of transactions that are supported are not limited to specific merchants and/or specific financial institutions.

Various consumer data may be stored within consumer profile 20. For example, financial account information 32, associated with accounts from multiple financial institutions, may be provided in the profile. Various financial accounts, including credit card accounts, checking accounts, investment accounts, loan accounts, and other financial accounts may be included in the profile. The information for each account may include an account number, as well as an additional information including any authentication information required to access the account on a financial institution system, e.g., a password or PIN.

Profile 20 may also include loyalty account information 34, which may include account numbers for various merchant loyalty accounts. The profile may also include coupons discounts or other information provided by a merchant and associated with the loyalty account for a consumer. Thus, for example, when a consumer attempts to make a purchase in a particular merchant, the loyalty account for that merchant may be accessed in association with the transaction, and any promotions, discounts or coupons made available by the merchant may be applied to the consumer's transaction.

Non-financial account information 36, such as medical account information, insurance information, etc., may also be provided in profile 20. Doing so may enable, for example, a doctor's office or hospital to download medical insurance information, patient records, or other medical-related information for the consumer. Insurance information may be used, for example, in the event of an automobile accident or other loss, whereby the consumer could provide insurance information to another party having access to the system.

Additional information associated with the consumer may also be provided as personal information 38. Additional information may include, for example Social Security number, or other information that a user may wish to associate with their profile. Additional information, such as prepaid phone cards, as well as other types of accounts not mentioned above, may also be associated with a consumer's profile. A consumer may also be permitted to enable or disable access to the consumer's profile by different financial institutions and/or merchants. Thus, a consumer may enable only certain merchants to provide promotions or otherwise access the consumer's profile data.

Within system 10 may be various types of computer servers to handle the various functions supplied by the system. For example, one or more Web servers 40 may be provided to provide access to the system over the Internet comic e.g., via a user friendly HTML interface. One or more application servers 42 may be used to provide the various application functions supported by the system. One or more database servers 44 may also be used to store the consumer profiles and assist in the management and storage of other data utilized by the system.

As will become more apparent below, various services are provided by system 10 to consumers 12, as well as merchants 14, terminals 16 and financial institutions 18. For example, transaction processing services 50 are provided to handle consumer transactions either via retail terminals or via online shopping. Other transactions, such as transferring funds, accessing financial institution accounts, etc., may also be supported by transaction processing services 50.

Purchase tracking services 52 may be utilized to catalog the items purchased by users within or outside of system 10. Browser tracking services 54 may be used to track the items that the user views while shopping on various merchant websites. Receipt management services 56 may be used to store the items purchased by users at various merchants, and may be used by consumers to add receipts purchased outside the system. The receipt management services may be used, for example, to enable users to dispute charges, validate purchases for warranty purposes, or otherwise retrieve prior purchase history information. Account management services 58 may be used to enable a user to manage their various accounts. The account management may be associated with consumer accounts, as well as merchant and financial institution accounts, so that merchants and financial institutions may also access relevant information in the system. Promotion management services 60 may be used to allow merchants to add promotions to a consumer's profile such that when a user shops with the merchant, relevant coupons or other promotions may be provided to the consumer.

It will be appreciated that the types of services provided by system 10 are not limited to those expressly discussed above. Other services and uses of a consumer profile will be apparent to one of ordinary skill in the art having the benefit of the instant disclosure.

Figure 2:
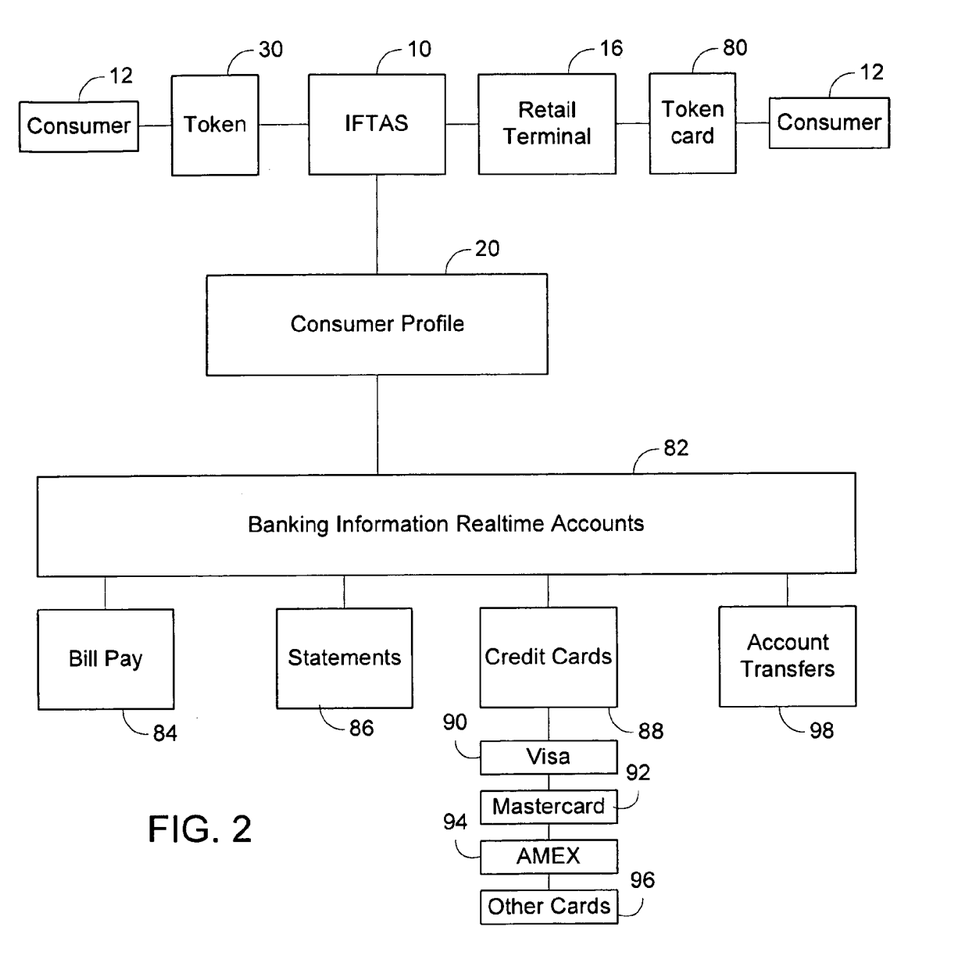
FIG. 2 is a block diagram illustrating the interaction of a consumer with the system of FIG. 1 in association with financial operations.

FIG. 2 next illustrates the interaction of a consumer with system 10 in performing various financial account management operations. Consumer 12 may access system can either be a token 30, e.g. by logging on via a website, or alternatively via a retail terminal 16 using a card 80 encoded with the consumer's token. The consumer is required to authenticate with system 10 by providing the token in any authentication information such as a password. Once authenticated, access to the consumer profile 20 is provided. Real-time access to banking information is provided as shown at 82, including various services such as Bill payment 84, banking statements 86, credit cards 88, and account transfers 98. Account transfers may occur between financial institutions, and are not limited between accounts in the same financial institution. The credit cards that are supported may include any known credit card, such as Visa 90, MasterCard 92, American Express 94 and any other cards 96 that may be supported by system 10. Consumers are permitted to add new accounts, delete accounts, edit accounts, and set up additional functions such as a default account or any backup accounts in the event that a default account is overdrawn or denied during a transaction.

Figure 3:
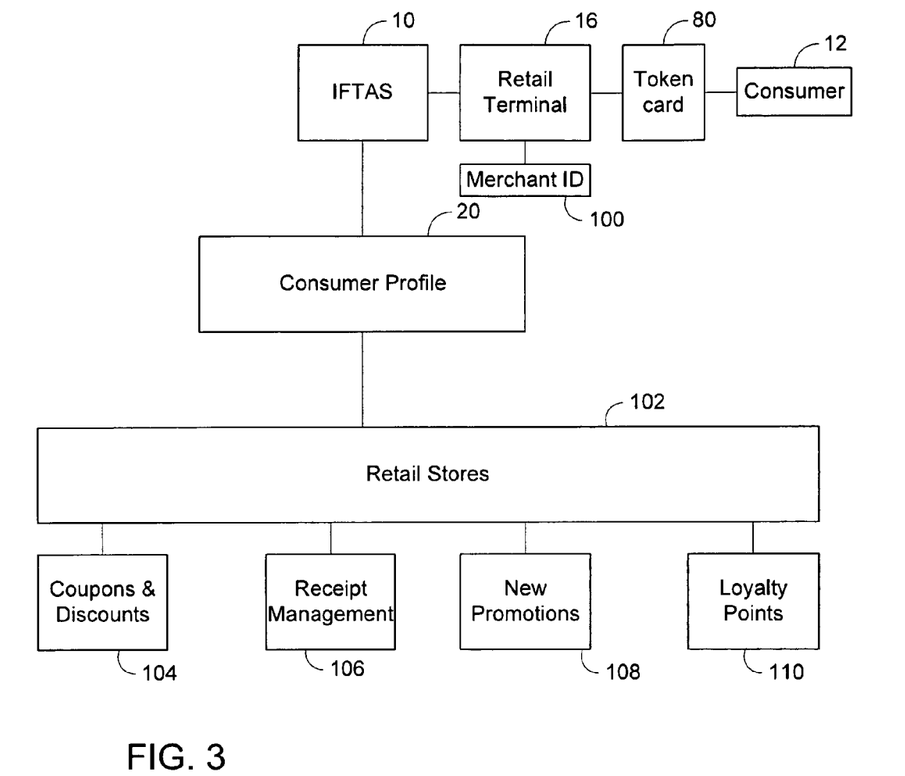
FIG. 3 is a block diagram illustrating the interaction of a consumer with the system of FIG. 1 in association with interacting with a retail store.

FIG. 3 next illustrates the interaction of the consumer with system 10 when interacting with a merchant such as a retail store. In this example, it is assumed that the retail store is not an online store, and as such, consumer 12 presents a token card 80 to a retail terminal 16 in order to access system 10. Retail terminal 16 is associated with the unique merchant ID 100 that enables system 10 to determine the merchant with which the transaction is associated. Retail store services 102 are provided to handle the transaction, as well as other store-related services. For example, coupons and discounts 104 may be presented to the consumer during the transaction or automatically applied to the transaction. Receipt management services 106 may be invoked to store the purchase information, and new promotions for this or future transactions may be a 108 during the transaction. The consumer may also look up past receipts, e.g., to perform store returns and for warranty purposes. In addition, as a result of the transaction, loyalty points 110 may be applied to the consumer's loyalty account.

As an example of a typical retail transaction using system 10, a consumer at a checkout swipes his or her token card, which is linked to the merchant and system 10. The system provides the consumer's loyalty account information to the merchant, so that the customer will be credited with points for the purchase. The consumer is presented with a list of payment options based on the consumer profile, and the consumer chooses a method of payment. The transaction is processed through system 10. In addition, if the merchant has any coupons stored in the consumer's profile, those coupons may be applied to the purchase to reduce the cost to the consumer. Thus, via system 10 a consumer may save additional money due to discounts of which the consumer may have not even known about.

Another feature that may be supported during transactions is an auto card default system, whereby a consumer may set up a desired order of accounts to use during a transaction, such that if a particular account is declined or canceled during the transaction, the system will try a next default account specified by the consumer.

Figure 4:
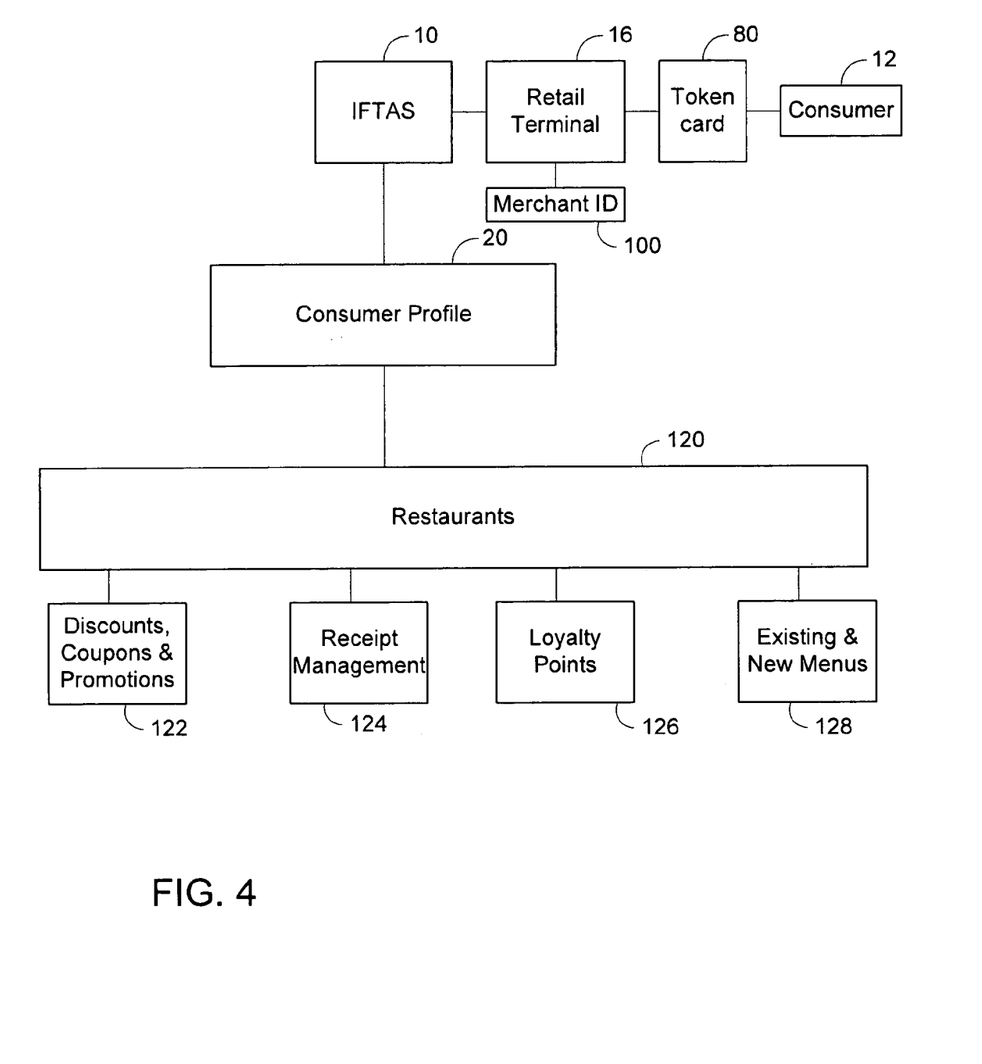
FIG. 4 is a block diagram illustrating the interaction of a consumer with the system of FIG. 1 in association with interacting with a restaurant.

FIG. 4 next illustrates the interaction of the consumer with system 10 when interacting with a merchant such as a restaurant. Restaurants may handled in the same manner as other retail stores, or may have different or additional services supported. Consumer 12 presents a token card 80 to a retail terminal 16 in order to access system 10. Retail terminal 16 is associated with the unique merchant ID 100 that enables system 10 to determine the merchant with which the transaction is associated. Restaurant services 120 are provided to handle the transaction, as well as other restaurant-related services. For example, promotions, coupons and discounts 122 may be presented to the consumer during the transaction. Receipt management 124 may be supported, and loyalty points 126 may be applied to the consumer's loyalty account.

A consumer may also be permitted to view existing or new menus 128, e.g., when viewing his or her profile on system 10.

Figure 5:
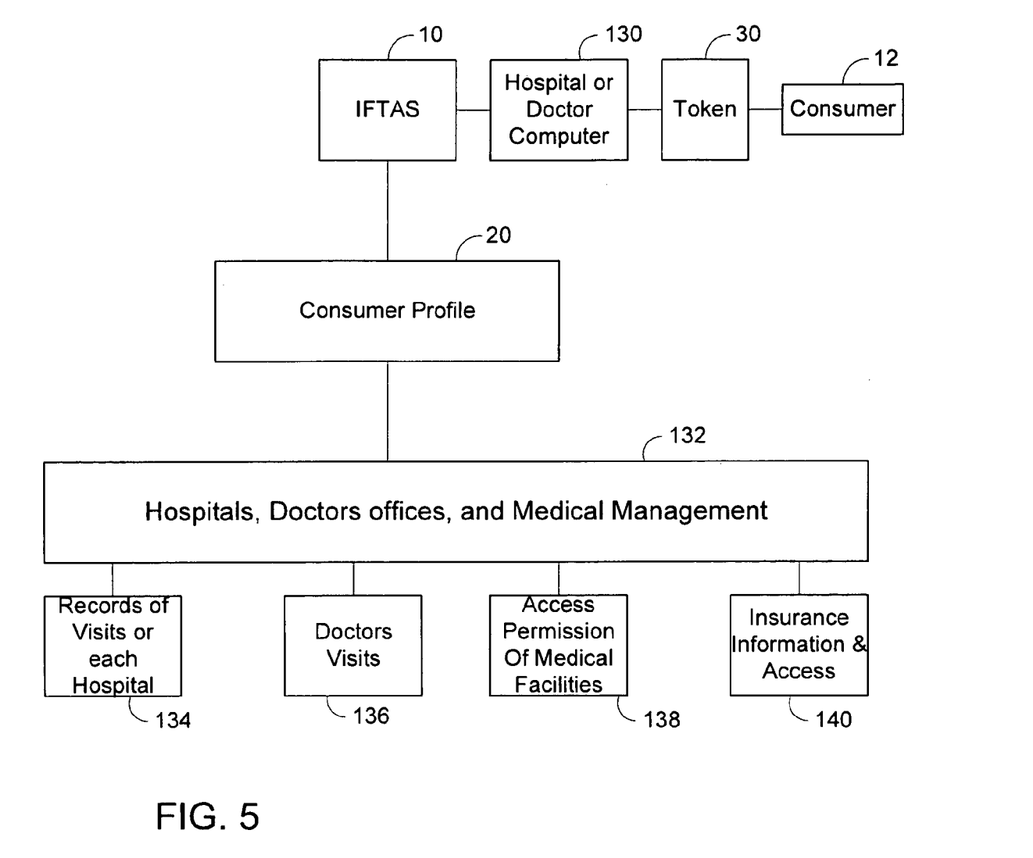
FIG. 5 is a block diagram illustrating the interaction of a consumer with the system of FIG. 1 in association with medical operations.

FIG. 5 next illustrates the interaction of the consumer with system 10 when interacting with a doctor or hospital. To do so, a hospital or doctors office computer 130 may be accessed by consumer 12 using token 30, or alternative, a terminal similar to a retail terminal may be used. Various medical management services 132 are provided, including, for example, retrieval of records of visits at various hospitals 134, doctors visits 136, or other medical records. In addition, a token may be used to access medical facilities, as illustrated at 138. Also, a consumer's medical insurance information 140 may be provided to a hospital or doctor upon presentation of the token, thus saving the consumer from having to carry a separate medical insurance card. In some embodiments, a medical provider such as a doctor or hospital may also be registered with the system, and may be permitted to update the medical information in the consumer's profile, e.g., to update the consumer's medical records after a visit to the medical provider.

In the illustrated embodiment, merchants, financial institutions and other entities are required to register with the system in addition to consumers. This would setup up a two-way connection for all member banking, stores, e-stores, restaurants, hotels and parks to install information, discounts, points, events, menus, coupons, loyalty cards into a member area of a consumer's profile, allowing the consumer to receive maximum savings on their purchase of goods and services, often without knowing about the discounts, promotions, or coupons or having to carry around additional cards or information. For the retail stores, e-stores, hotels, parks, and restaurants, by having a two-way connection they in turn would be able to track buying habits of the consumer, optionally including that of any and all purchases at competitors by the consumer to market more effective ways to attract the consumer and at the same time giving the consumer maximum benefit via discounts and promotions (thus allowing all retailers, restaurants, hotels to compete with each other better by knowing the buying habits of the consumer thus giving bigger and better discounts than their competition).

Figures 6, 7:
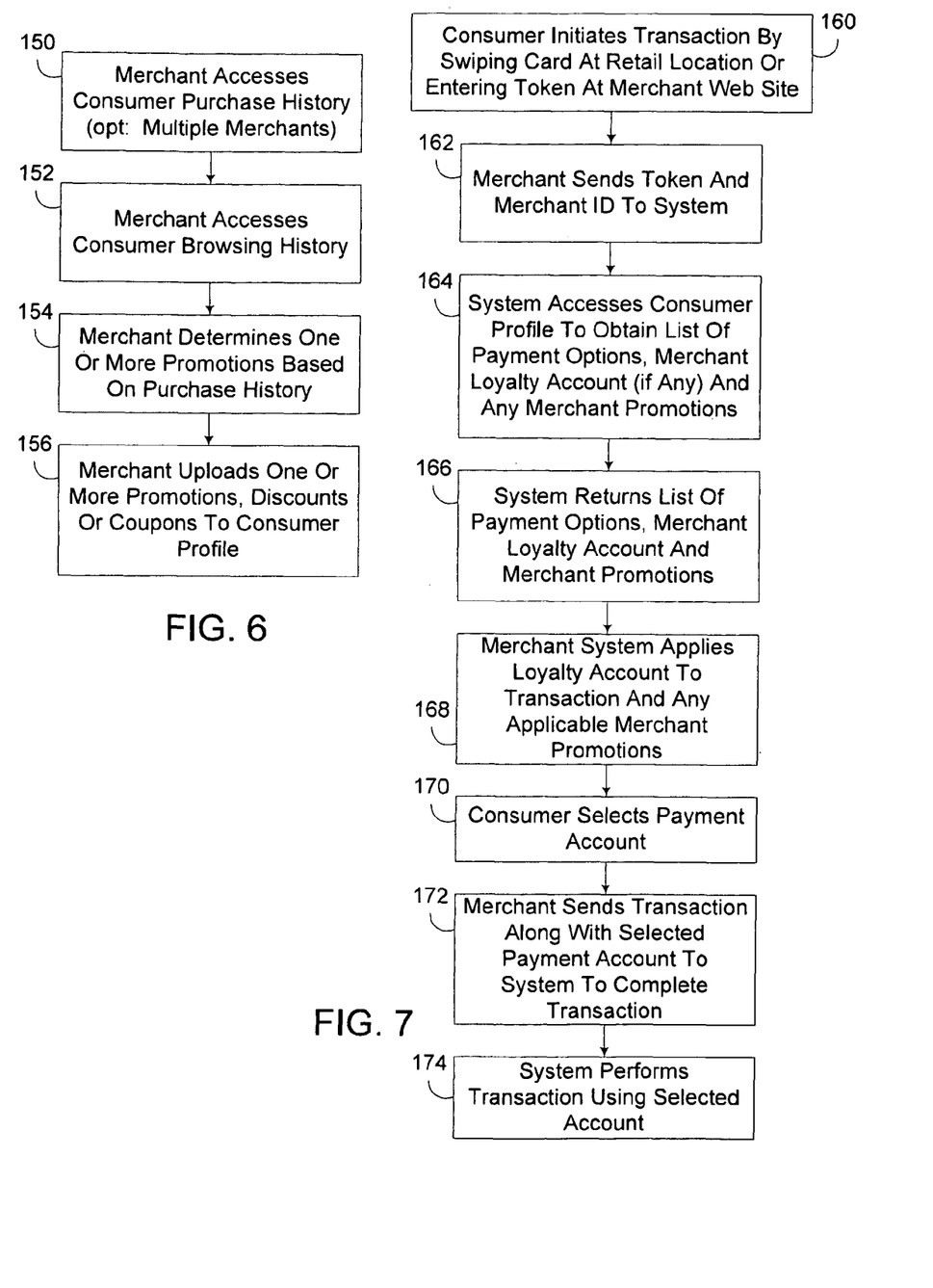
FIG. 6 is a flowchart illustrating the interaction of a merchant with the system of FIG. 1.
FIG. 7 is a flowchart illustrating the interaction of a consumer with the system of FIG. 1 during a retail transaction.

For example, FIG. 6 illustrates the interaction of a merchant with system 10 in order to supply promotions, discounts and coupons to a consumer. For example, a merchant, once registered with system 10, may be provided with access to the consumer's purchase history at block 150, including optionally, the purchase history of the consumer at competitors of the merchant. As shown at block 152, the merchant may also optionally access a consumer browsing history. It may be desirable, for example, to enable a consumer to shop online via a website for system 10, either via a dedicated web site, or by framing merchant websites and tracking the history of the consumer when viewing such web sites. By doing so, a merchant may also be alerted as to what products a consumer has been looking at on line, thus identifying other potential promotional opportunities.

Based upon some or all of the above information, the merchant determines one or more promotions to give to the user in block 154, and the promotions are uploaded to the consumer's profile in block 156.

The promotions may be viewable by the consumer when logged into system 10, encouraging consumers to purchase items from the merchant. In addition, as shown in FIG. 7, the promotions may be automatically or manually applied to a consumer transaction in association with a purchase by the consumer. FIG. 7, in particular, illustrates the interaction of a consumer with a merchant. As shown in block 160, the consumer initiates the transaction by swiping the token card at a terminal at a retail location or entering the token at a merchant web site. Next, in block 162, the merchant sends the token and a merchant ID to the system. Next, in block 164, the system accesses the consumer profile using the token and obtains a list of payment options, as well as the loyalty account number for the merchant (if any) and any coupons, promotions or discounts that the merchant has uploaded to the consumer's profile. Next, in block 166 the system returns the list of payment options, the loyalty account and the merchant promotions to the merchant, and in block 168, the merchant system applies the loyalty account number to the transaction and applies any merchant promotions to the transaction. In addition, the customer may be notified via the terminal or web site of the promotions and the application of the loyalty account. If promotions are optional (e.g., if a consumer has multiple alternative promotions) the consumer may also select which if any promotions to apply.

In block 170, the consumer is presented with a list of payment options on the terminal or web site. In addition, a default payment account may be identified if so specified in the profile. A consumer may also specify different default accounts for different merchants in the profile. The consumer then selects the desired payment account.

Next, in block 172, the merchant sends the transaction information along with the selected payment account to the system to complete the transaction. Then, in block 174, the system performs the transaction using the selected account and returns an authorization to the merchant. At this point the transaction is complete. It will also be appreciated that at this time purchase history information, receipt information, etc. may also be updated in the system.

To join system 10, a consumer typically signs up via a web site, and once registered, inputs any financial accounts, loyalty accounts, medical information and other personal information into that consumer's profile. The consumer will typically be issued a token card in a similar manner to that for credit cards, so that the consumer can begin to use the system in the manner described herein.

Figure 8:
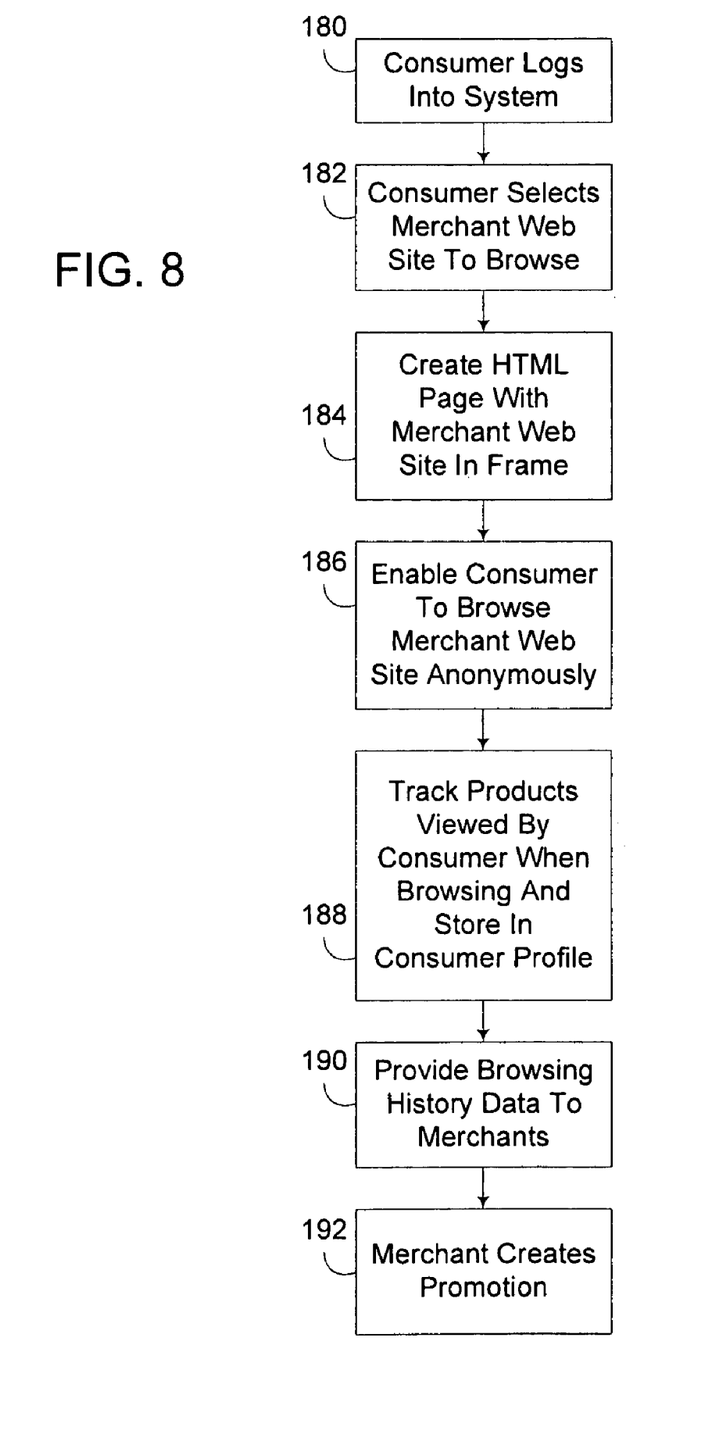
FIG. 8 is a flowchart illustrating the tracking of browsing history for a consumer with the system of FIG. 1.

As noted above, in addition to basing promotions on purchase history, promotions may be based on consumer browsing history. For example, as shown in FIG. 8, the browsing history of a consumer may be tracked by first identifying the consumer in block 180 in response to the consumer logging into the system. The consumer selects a merchant web site to browse in block 182, and the system creates an HTML page with the merchant web site opened in a frame of the page in block 184. By doing so, the consumer is identified to the system but does not have to be logged into the merchant web site in order for the browsing history to be tracked. Thus, as shown in block 186, the consumer may browse the merchant web site anonymously, and the products viewed by the consumer may be tracked and stored in the consumer profile in block 188. Thereafter, a merchant may access the browsing history as shown at block 190, and create one or more promotions for the consumer at block 192. Thus, for example, a merchant may determine that a consumer has been viewing televisions on one or more web sites, and choose to offer a coupon for a television via system 10.

Various additional features may be supported consistent with the invention. For example, it may be desirable to permit a consumer to access via the system account numbers of accounts, view past transactions, view digital images of checks, pay bills, make payments on accounts, transfer funds between accounts, dispute transactions with merchants, view purchase histories, view merchant receipts, view merchant promotions, dispute transactions.

Additionally, a profile may include insurance information (e.g., medical, car, life). A consumer can make any insurance company a member of their network, and once a member, the consumer can view all insurance and claim history and by supplying a third party (e.g., a medical provider) with a special database insurance access number the third party can then tap into the consumer's data. A consumer can control what data a provider can view, e.g., insurance information, claim history, insurance company name, etc.

Additionally, a consumer may be permitted to access receipts from a merchant via system 10. In such instances, a merchant may provided system 10 with remote access to a consumer's purchase history on a merchant system, so that the consumer may retrieve purchase data through the system.

A token card may be configured as a standard credit card having a number that identifies the operator of system 10 as the merchant services processor, e.g., so that when the card is used in a terminal that is not equipped to interact with system 10, the card will be treated as a conventional credit card, with the transactions routed to system 10 as an ISO so that a default account stored in the profile will be charged in the same manner as a conventional credit card.

A token may also be associated with an entry system, e.g., to allow access to buildings, vehicles, etc.

Various additional modifications may be made without departing from the spirit and scope of the invention. Therefore, the invention lies in the claims hereinafter appended.

What is claimed is:

1. A method of managing a consumer profile, the method comprising:
   in response to input from a consumer, creating a consumer profile, the consumer profile identifying a plurality of financial accounts suitable for making payments and respectively associated with a plurality of financial institutions and a plurality of loyalty accounts associated respectively with a plurality of merchants;
   associating a token with the consumer profile;
   storing the consumer profile in an integrated financial transaction and access system that is independent of the plurality of financial institutions and the plurality of merchants;
   in response to the consumer initiating a transaction with a first merchant among the plurality of merchants by providing the token to the first merchant:
      receiving the token from the first merchant at the integrated financial transaction and access system;
      accessing the consumer profile associated with the token to obtain the list of financial accounts;
      accessing the consumer profile to identify a loyalty account associated with the first merchant;
      communicating the list of financial accounts and the loyalty account to the first merchant to enable the consumer to select a financial account from the list of financial accounts and to enable the first merchant to apply the loyalty account to the transaction;
      receiving a selected financial account from the first merchant at the integrated financial transaction and access system; and
      in the integrated financial transaction and access system, completing the transaction using the selected financial account;
   registering the plurality of merchants with the integrated financial transaction and access system;
   establishing a two-way connection between each registered merchant and the consumer profile to enable each registered merchant to view consumer purchase history information in the consumer profile and to install promotions to the consumer profile, wherein the consumer purchase history information viewable by each registered merchant identifies purchases made by the consumer at at least one competitor of such registered merchant; and with the integrated financial transaction and access system:
authenticating the consumer using the token;
generating an HTML page with a frame within which at least one merchant web site of at least one of the plurality of merchants may be displayed;
tracking a browsing history of the consumer while the consumer anonymously browses the at least one merchant web site without being identified to the merchant web site displayed within the HTML page when authenticated to the integrated financial transaction and access system;
storing the browsing history in the consumer profile;
providing the browsing history to the first merchant prior to the consumer initiating the transaction;
providing consumer purchase history information to the first merchant prior to the consumer initiating the transaction, wherein the consumer purchase history includes purchases made by the consumer at at least one competitor of the first merchant;
receiving from the first merchant at least one promotion for the consumer, wherein the promotion is based at least in part on both the consumer's purchases at the at least one competitor of the first merchant and the browsing history stored in the consumer profile of the consumer;
storing the promotion in the consumer profile; and
in response to the consumer initiating the transaction, accessing the consumer profile to identify the promotion, communicating the promotion with the list of financial accounts and the loyalty account to the first merchant such that the promotion is automatically applied to the transaction by the first merchant.

2. The method of claim 1, further comprising:
registering each of the plurality of financial institutions with the integrated financial transaction and access system; and
providing electronic access for the plurality of financial institutions to the integrated financial transaction and access system.

3. The method of claim 1, wherein receiving the token and receiving the selected financial account are performed by electronically interacting with a terminal disposed at a retail location.

4. The method of claim 1, wherein receiving the token and receiving the selected financial account are performed by electronically interacting with a merchant web site.

5. The method of claim 1, further comprising storing medical information in the consumer profile in response to consumer input.

6. The method of claim 5, further comprising updating the medical information in the consumer profile in response to input from a medical provider.

7. The method of claim 1, further comprising via a web site associated with the integrated financial transaction and access system, displaying menu information for a merchant to a consumer in response to consumer input.

8. The method of claim 1, further comprising via a web site associated with the integrated financial transaction and access system, transferring funds between financial accounts associated with different financial institutions in response to consumer input.

9. The method of claim 1, further comprising via a web site associated with the integrated financial transaction and access system, viewing merchant receipts in response to consumer input.

10. The method of claim 1, wherein the token comprises an account number, and wherein receiving the token includes receiving the token after a card upon which is encoded the account number is presented to a merchant.

11. The method of claim 10, wherein the account number is processable by a credit card transaction system such that the card is additionally usable as a credit card.

12. The method of claim 1, wherein providing consumer purchase history information to the first merchant prior to the consumer initiating the transaction includes providing each of the plurality of registered merchants with purchases by the consumer made at others of the plurality of registered merchants to enable the plurality of registered merchants to compete with one another when generating promotions for the consumer.

13. An apparatus, comprising:
an integrated financial transaction and access system including at least one hardware processor, wherein the integrated financial transaction and access system is independent of a plurality of financial institutions and a plurality of merchants; and
program code configured to be executed by the at least one hardware processor to perform a method of managing a consumer profile, the program code configured to:
in response to input from a consumer, create a consumer profile, the consumer profile identifying a plurality of financial accounts suitable for making payments and respectively associated with the plurality of financial institutions and a plurality of loyalty accounts associated respectively with the plurality of merchants;
associate a token with the consumer profile;
store the consumer profile in the integrated financial transaction and access system;
in response to the consumer initiating a transaction with a first merchant among the plurality of merchants by providing the token to the first merchant:
receive the token from the first merchant at the integrated financial transaction and access system;
access the consumer profile associated with the token to obtain the list of financial accounts;
access the consumer profile to identify a loyalty account associated with the first merchant;
communicate the list of financial accounts and the loyalty account to the first merchant to enable the consumer to select a financial account from the list of financial accounts and to enable the first merchant to apply the loyalty account to the transaction;
receive a selected financial account from the first merchant at the integrated financial transaction and access system; and
complete the transaction using the selected financial account;
register the plurality of merchants with the integrated financial transaction and access system;
establish a two-way connection between each registered merchant and the consumer profile to enable each registered merchant to view consumer purchase history information in the consumer profile and to install promotions to the consumer profile, wherein the consumer purchase history information viewable by each registered merchant identifies purchases made by the consumer at at least one competitor of such registered merchant;

authenticate the consumer using the token;

generate an HTML page with a frame within which at least one merchant web site of at least one of the plurality of merchants may be displayed;

track a browsing history of the consumer while the consumer anonymously browses the at least one merchant web site without being identified to the merchant web site displayed within the HTML page when authenticated to the integrated financial transaction and access system;

store the browsing history in the consumer profile; and provide the browsing history to the first merchant prior to the consumer initiating the transaction;

provide consumer purchase history information to the first merchant prior to the consumer initiating the transaction, wherein the consumer purchase history includes purchases made by the consumer at at least one competitor of the first merchant;

receive from the first merchant at least one promotion for the consumer, wherein the promotion is based at least in part on both the consumer's purchases at the at least one competitor of the first merchant and the browsing history stored in the consumer profile of the consumer;

store the promotion in the consumer profile; and in response to the consumer initiating the transaction, access the consumer profile to identify the promotion, and communicate the promotion with the list of financial accounts and the loyalty account to the first merchant such that the promotion is automatically applied to the transaction by the first merchant.

* * * * *